United States Patent [19]

Inoue et al.

[11] Patent Number: 4,472,744

[45] Date of Patent: Sep. 18, 1984

[54] PHOTOELECTRIC CONVERTER APPARATUS

[75] Inventors: Yasuo Inoue; Hiromitsu Momoki; Takatoshi Ikeda, all of Yokohama, Japan

[73] Assignee: Hitachi, Ltd., Tokyo, Japan

[21] Appl. No.: 318,370

[22] Filed: Nov. 5, 1981

[30] Foreign Application Priority Data

Nov. 8, 1980 [JP] Japan ............................... 55-156459

[51] Int. Cl.$^3$ ........................ H04N 3/14; H04N 1/10
[52] U.S. Cl. .................................... 358/293; 358/213
[58] Field of Search ................ 382/50; 358/213, 293, 358/212, 294; 357/24 LR; 250/578

[56] References Cited

U.S. PATENT DOCUMENTS 4,281,254  7/1981  Seachman .................... 357/24 LR

OTHER PUBLICATIONS

"Image Sensor with Integration Time Control," by Gaebelein et al., IBM Technical Disclosure Bulletin, vol. 20, No. 6, 11-1977, pp. 2177-2178.

Primary Examiner—John C. Martin
Assistant Examiner—Michael D. Parker
Attorney, Agent, or Firm—Antonelli, Terry & Wands

[57] ABSTRACT

A photoelectric converter apparatus suitable for use as an optical pattern reader is disclosed. A CCD image sensor receives light reflected from a text having characters or graphic patterns marked thereon and stores charges proportional to the intensity of the reflected light. Unnecessary charges are transferred from the CCD image sensor to the shift register and are swept out during a time period other than a readout period for necessary data. The readout data which exactly reflects the data on the text is produced with a reduced sweep-out period.

7 Claims, 5 Drawing Figures

PHOTOELECTRIC CONVERTER APPARATUS

BACKGROUND OF THE INVENTION

1. Field of the Invention

The present invention relates to an apparatus for reading letters, characters and/or graphic patterns and converting them to electric signals, and more particularly to a photoelectric converter apparatus in a pattern reading system which converts letters, characters and/or graphic patterns to electric signals by photoelectrically converting light reflected from a document on which letters, characters and/or graphic patterns are marked, and injected on the picture cells.

2. Description of the Prior Art

In an apparatus for converting characters and graphic patterns to electric signals such as facsimile or optical character reader (OCR), a charge storage type photoelectric converter device or a charge coupled device (CCD) has been used as a photoelectric converter apparatus of a pattern reading system for converting the character and graphic patterns to the electric signals. The charge storage type photoelectric converter device may typically comprise a photo-diode array in which charge is stored by radiation of light.

The pattern reading system comprises a light source for illuminating a document having characters and/or graphic patterns marked thereon, a photoelectric converter apparatus having a number of linearly arranged photo-diodes and a readout circuit for serially reading out charges stored in the photo-diodes.

The light emitted from the light source and reflected by the document is condensed by a lens and directed to and imaged on the photo-diode array of the photoelectric converter apparatus. After a predetermined period for the storage of the charge, the charge is read by the readout circuit. The above operation is repeated a number of times while sequentially displacing the document.

A white area on the document reflects a large quantity of light and hence a photo-diode on which is imaged a white area of the image stores a large amount of charge. On the other hand, a photo-diode on which is imaged a black area of the image stores a small amount of charge. In this manner, an electrical signal representative of a density of the document is produced.

The amounts of charges may be handled in the form of an analog quantity but in many cases they are converted to "1" or "0" (white/black) digital signals by comparing the detected signal with a predetermined threshold level.

In a conventional apparatus, when the charge storage type CCD photoelectric converter device (hereinafter referred to as the CCD photo-sensor) is driven, unnecessary charges stored in the respective picture cells of the diode array of the photo-sensor are transferred to a CCD analog shift register once for each start of a scan command to sweep away the unnecessary stored charges from the diode array and then text readout data is stored in the diode array. However, when a large quantity of light has been irradiated or an interval between adjacent starts of a scan command is long, the charges in the photo-diode array may not be completely swept away in a predetermined short period and the signal charges may be superposed on or added to the unnecessary charges left behind in the respective picture cells. Further, since the capacity of each cell of the shift register is smaller than that of the image-sensing photodiode array, the cells of the shift register may be saturated if the amount of charge transferred from the image sensor is large. In such cases, the readout data does not faithfully reflect the data on the text.

In a CCD photosensor drive system, a transfer gate may be opened to sweep away the charges in the picture cells during time periods other than the storage period and data output period in order to enable storage of only the desired signal charges and to provide an effective output signal. Here, the analog shift register is driven to sweep away or clear the transferred charge even during the storage period. The sweeping away of unnecessary data from the shift register requires the same time period as the time period for the effective data output from the shift register. If the storage time period for the photodiode array is set to be shorter than the sweeping away time period for the shift register, and the charges stored in the photo-diode array as the effective data are transferred to the analog shift register which has not been completely cleared, the left-behind invalid data will be superimposed on or added to the effective data and the readout data from the shift register will no longer reflect the data on the text faithfully. Further reference should be made to U.S. Pat. No. 4,177,449 assigned to the present assignee.

SUMMARY OF THE INVENTION

It is a first object of the present invention to provide a photoelectric converter apparatus which prevents disturbance of the output due to unnecessary charges and enables output of readout data which exactly reflects the data on a text.

The essence of the present invention is that unnecessary charges in a photoelectric converter are swept away at all times except during the output period of necessary readout data.

It is a second object of the present invention to provide a photoelectric converter apparatus which can output readout data which exactly reflects the data on a text even when a sweeping away period is shortened and a storage time period is shortened.

In accordance with an aspect of the present invention, the store of data is started by a start of scan signal and a shift clock of an analog shift register in the storage period is set to be a higher frequency than a shift clock for outputting effective data in order to sweep away unnecessary data in the analog shift register faster so that a time period for sweeping away the unnecessary data from the shift register is shortened and hence the storage time period can be shortened.

DESCRIPTION OF THE PREFERRED EMBODIMENTS

Figure 1:
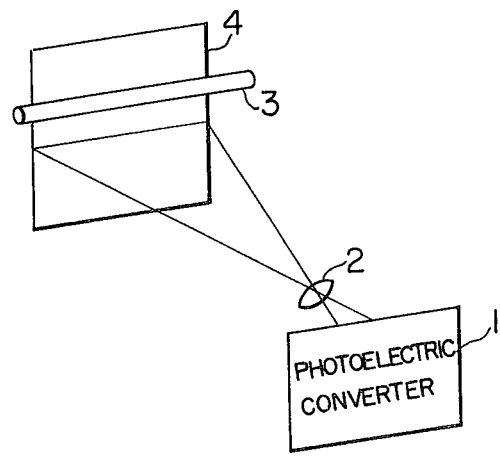
FIG. 1 illustrates a readout system.

FIG. 1 illustrates a text readout system in a facsimile system. Information (pattern) on a sending text 4 illuminated by a fluorescent lamp 3 is fed to a photoelectric converter circuit 1 through a lens 2, where it is photoelectrically converted. The photoelectrically converted information is transmitted to a receiving station as require '.

The photoelectric converter circuit 1 has conventionally used photo-diodes or photo-transistors, but a CCD photosensor has been increasingly used from the standpoints of high packaging density and economy. The CCD photosensor is solid state and can be formed into an integrated circuit. Various structures and various drive systems have been proposed for the CCD photosensor.

The CCD photosensor comprises a CCD imager (diode array) including a plurality of picture cells for storing photoelectrically converted charges, a transfer gate for controlling transfer of the charges stored in the respective cells of the CCD imager and an analog shift register for storing the charges transferred by the transfer gate and sequentially shifting out the charges in response to an external shift clock. The shifted-out data include effective data and unnecessary data. Only the effective data is selected for the transmission to the receiving station.

Figure 2:
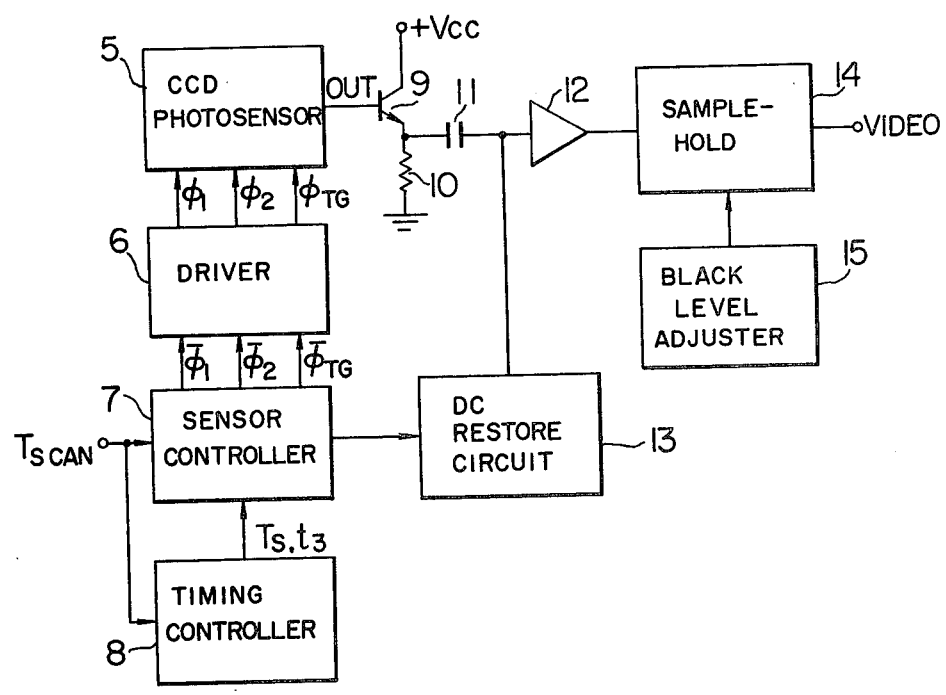
FIG. 2 illustrates an overall configuration of an embodiment of the present invention.

FIG. 2 shows an embodiment of the photoelectric converter to be used in a facsimile system.

A CCD photosensor 5 reads a scan line of data parallely and outputs the data serially. More particularly, the photosensor 5 stores, transfers and sends (shifts) the data by a drive circuit 6 which is controlled by a sensor control circuit 7. The serial data shifted out of the photosensor 5 is outputted through an emitter follower (impedance transforming) transistor configuration 9 and a resistor 10. The output is then supplied to a capacitor 11 to eliminate the D.C. component and then applied to a video amplifier 12. Since the A.C. component after the elimination of unnecessary D.C. component by the capacitor 11, has a small amplitude, a D.C. component is intentionally added by a D.C. restore circuit 13 which is controlled by the control circuit 7. The output of the video amplifier 12 is fed to a sample-hold circuit 14 where it is sampled and held. The circuit 14 digitizes the input signal thereto to a black and white binary signal or multi-level signal in accordance with an output from a black level adjustment circuit 15. The output of the circuit 14 is a video signal VIDEO. The control circuit 7 is controlled by a start of line scan signal (scan command signal) $T_{SCAN}$ and a storage time signal $T_S$ and a timing signal $t_3$ for data output from the timing control circuit 8.

Figure 3:
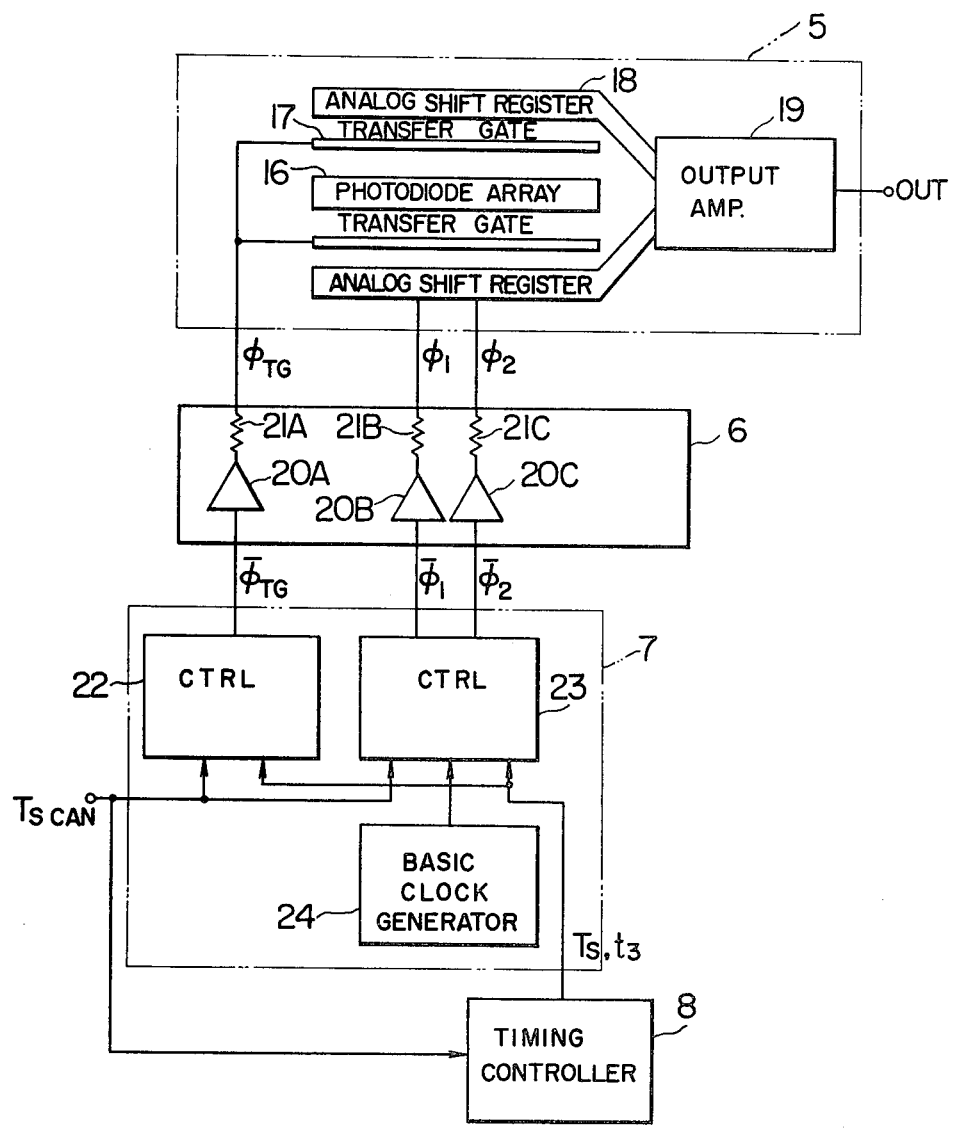
FIG. 3 illustrates main part of an embodiment of the present invention including CCD photosensor.

FIG. 3 shows a configuration of the CCD photosensor 5 and a drive system for the sensor. The CCD photosensor 5 comprises a CCD photodiode array 16 having a function of a CCD imager, transfer gates 17, analog shift registers 18 and an output amplifier 19. The driver circuit 6 comprises MOS drivers 20A, 20B and 20C, and damping resistors 21A, 21B and 21C, and it receives the outputs $\overline{\phi_{TG}}$, $\overline{\phi_1}$ and $\overline{\phi_2}$ of the sensor control circuit 7 and produces a transfer gating signal $\phi_{TG}$ for the transfer gates 17 and shifting pulses $\phi_1$ and $\phi_2$ for the analog shift registers 18. The outputs $\phi_1$ and $\phi_2$ are of opposite phase to each other. The photodiode array 16 has a capacity of one scan line of data, for example, a total of 2048 bits, and is divided into even and odd 1024-bit groups. In FIG. 3, the upper transfer gate and shift register and the lower transfer gate and shift register are allocated to the odd group and the even group, respectively. The damping resistors 21A, 21B and 21C are used for the level adjustment. The sensor control circuit 7 comprises control circuits 22 and 23 and a basic clock generator circuit 24. The control circuit 22 receives $T_{SCAN}$ and $T_S$ and produces $\overline{\phi_{TG}}$. The control circuit 23 receives $T_{SCAN}$, $T_S$ and the basic clock and produces $\overline{\phi_1}$ and $\overline{\phi_2}$.

The control circuit 22 for controlling the transfer gates 17 basically comprises a one-shot multivibrator and practically may comprise a one-shot multivibrator and a flip-flop for synchronously controlling the one-shot multivibrator. The other control circuit 23 for controlling the shift register basically comprises a frequency divider and may practically comprise a frequency divider driven by the storage time signal supplied from the storage time controller for dividing the basic clock pulse supplied from the basic clock generator 24, and a flip-flop with preset and clear functions for stopping supply of the signal $\overline{\phi_1}$ and $\overline{\phi_2}$ during the time period $t_2$ to be explained later where the signal $\phi_{TG}$ takes the high level (connection between the controllers 22 and 23 being not shown).

Figure 4:
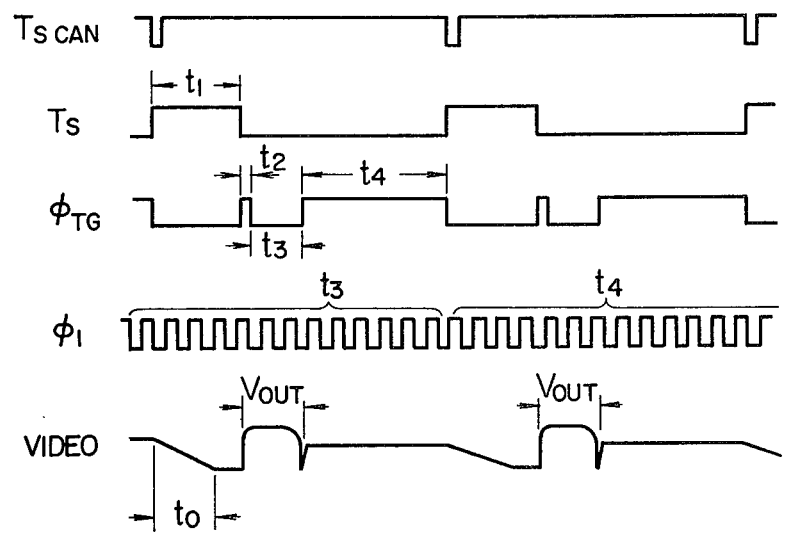
FIG. 4 illustrates a time chart for eliminating disturbance of output data due to unnecessary charges.

FIG. 4 shows a time chart for sweeping away the unnecessary charges for eliminating the disturbance of the output due to the unnecessary charges, which is the first object of the present invention. While the clock $\phi_1$ is shown only for periods $t_3$ and $t_4$, similar pulses are generated also in the period $t_1$. The operation of the CCD photosensor 5 is now explained with reference to the time chart of FIG. 4. The start of scan line signal $T_{SCAN}$ is produced (L-level) at the beginning of each scan line. For a character to be scanned by eight scan lines, eight starts of scan line signal $T_{SCAN}$ are generated to complete the scan of that character. The storage time pulse $T_S$ supplied from the timing controller 8 has a duration equal to the storage time $t_1$ for each scan line period. The control circuit 22 receives $T_{SCAN}$ and $T_S$ and produces the signal $\overline{\phi_{TG}}$ which is of opposite phase to the transfer gate control signal $\phi_{TG}$ shown in FIG. 4. The transfer gate control signal $\phi_{TG}$ is particularly explained. The signal $\phi_{TG}$ comprises a L-level pulse in the period $t_1$, an H-level pulse in the period $t_2$, and L-level pulse in the period $t_3$ and an H-level pulse in the period $t_4$, for each scan line. When the start of scan signal $T_{SCAN}$ is generated, the transfer gate control signal $\phi_{TG}$ assumes the L-level so that the transfer gate 17 is closed to isolate the CCD picture cells. The charges (data) having been transferred to the analog shift register 18 through the transfer gate 17 up to this time are swept away by the shifting clock signals $\phi_1$ and $\phi_2$ (e.g. at 200 kHz) through the output amplifier 19 during the period $t_0$. Namely, the period $t_0$ is the time required to sequentially output data for one scan line transferred parallelly to the shift register. Here, $t_1$ should be larger than $t_0$ for clearing unnecessary data from the shift register. After the storage time $t_1$, the transfer gate control signal $\phi_{TG}$ assumes the H-level and the charges stored in the array 16 during the period $t_1$ are transferred to the shift register 18 through the transfer gate 17 during the period $t_2$. After the period $t_2$, the control signal $\phi_{TG}$ assumes the L-level so that the transfer gate 17 is closed to separate the shift register 18 from the array 16 and the charges transferred to the shift register 18 are shifted right in synchronism with the clock signals $\phi_1$ and $\phi_2$ to produce the output Vout through the output gate 19 during the time period $t_3$. Here, it may be noted that $t_3$ is substantially equal to $t_0$. After the period $t_3$ in which the output Vout is sequentially outputted, the signal $\phi_{TG}$ assumes the H-level so that the gate 17 is opened for the period $t_4$ and the charges in the array 16 are transferred to the shift register 18 through the transfer gate 17 and shifted out by the clock signals $\phi_1$ and $\phi_2$ during this period $t_4$ until the next start of scan signal $T_{SCAN}$ is produced. Since the signal produced during the period $t_4$ is not an effective data signal, it is eliminated as the unnecessary signal component. Accordingly, only the output Vout produced in the period $t_3$ shown in FIG. 4 is processed as the normal sending signal. The above operation is carried out for each scan line.

Figure 5:
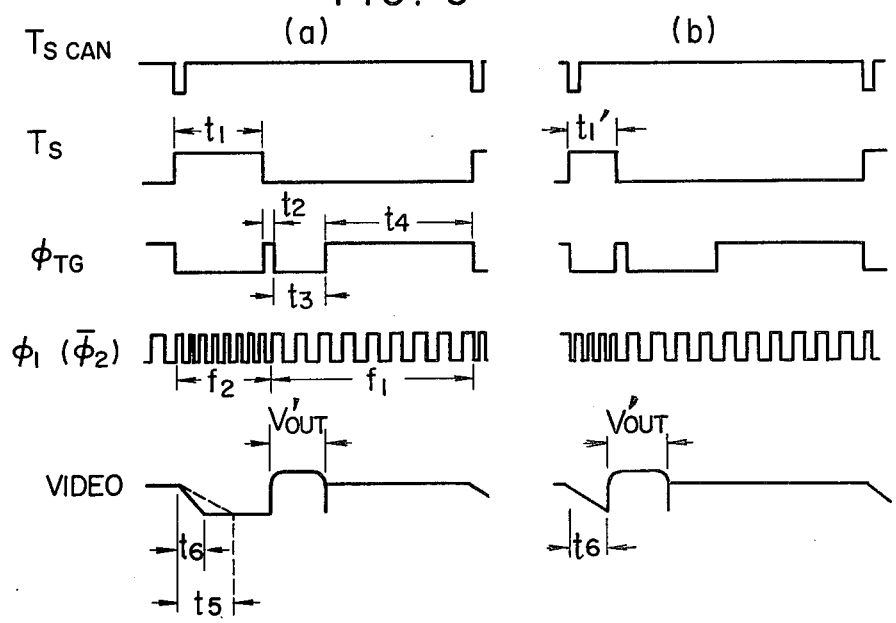
FIG. 5 illustrates a time chart for shortened sweepout time period.

FIG. 5 shows a time chart for shortening the sweep-away period, which is the second object of the present invention. The operation of the CCD photosensor 5 is now explained with reference to the time chart of FIG. 5(a). The start of scan signal $T_{SCAN}$ is generated (L-level) at the beginning of each scan line. For a character to be scanned by eight scan lines, eight starts of scan line signals $T_{SCAN}$ are generated to complete the scan for that character. The storage time pulse $T_S$ has a duration equal to the storage period $t_1$ for each scan line. The control circuit 22 receives $T_{SCAN}$ and $T_S$ and produces the signal $\bar{\phi}_{TG}$ which is of opposite phase to the transfer gate control signal $\phi_{TG}$ shown in FIG. 5(a). The transfer gate control signal $\phi_{TG}$ is particularly explained. The signal $\phi_{TG}$ comprises an L-level pulse in the period $t_1$, and H-level pulse in the period $t_2$, an L-level pulse in the period $t_3$ and an H-level pulse in the period $t_4$, for each scan line as is the case in FIG. 4. When the start of scan signal $T_{SCAN}$ is generated, the transfer gate control signal $\phi_{TG}$ assumes the L-level so that the transfer gate 17 is closed. The charges (data) having been transferred to the analog shift registers 18 through the transfer gate 17 upto the start of each scan will be swept out by the transfer clock signals $\phi_1$ and $\phi_2$ through the output amplifier 19 during the period $t_5$ which corresponds to $t_0$ of FIG. 4, if the repetition frequency of $\phi_1$ and $\phi_2$ is for example 500 kHz. In FIG. 5(a), the repetion frequency $f_2$ of $\phi_1$ and $\phi_2$ during period $t_1$ is set higher than the frequency $f_1$ during the output period $t_3$. Thus, the shift registers 18 are swept out in the period $t_6$. After the storage period $t_1$, the transfer gate control signal $\phi_{TG}$ assumes the H-level and the charges stored in the array 16 during the period $t_1$ are transferred to the shift registers 18 through the transfer gates 17 during the period $t_2$. After the period $t_2$, the control signal $\phi_{TG}$ assumes the L-level so that the transfer gates 17 are closed and the charges transferred to the shift registers 18 are shifted right in synchronism with the clock signals $\phi_1$ and $\phi_2$ which has the repetition frequency $f_1$ lower than $f_2$ to produce the output Vout through the output gate 19. After the period $t_3$ in which the output Vout is sequentially outputted, the signal $\phi_{TG}$ assumes the H-level so that the gates 17 are opened and the charges in the array 16 are transferred to the shift registers 18 through the transfer gates 17 and shifted out by the clock signals $\phi_1$ and $\phi_2$ during the period $t_4$ until the next start of scan signal $T_{SCAN}$ is generated. Here, the frequency of clock $\phi_1$ and $\phi_2$ may be $f_2$ instead of $f_1$. Since the signal produced during the period $t_4$ is not the normal sending signal, it is eliminated as the unnecessary signal. Accordingly, the output Vout produced in the period $t_3$ shown in FIG. 5(a) is processed as the normal sending information. The above operation is carried out for each scan line. Since the frequency $f_2$ of the clock $\phi_1$ and $\phi_2$ during the storage period $t_1$ is set higher than the frequency $f_1$ of the clock $\phi_1$ and $\phi_2$ during the read-out period $t_3$, the time period required for clearing the unnecessary data from the shift register is shortened (e.g. from $t_5$ to $t_6$). This enables reduction of the storage time period $t_1$ to be less than the read-out period $t_3$ as illustrated in FIG. 5(b). FIG. 5(b) shows an extreme case where the storage time period $t_1'$ is reduced to be equal to the time period $t_6$ required for sweeping the shift register.

The present embodiment has the following advantages. In the prior art, since the signal $\phi_{TG}$ is at L-level during the period $t_4$, the transfer gate 17 is kept closed. As a result, the unnecessary charges are stored in the array 16 during the period $t_4$ resulting in three disadvantages. First, the array 16 is saturated (particularly when the light intensity is high) during the period $t_4$. Secondly, a time long enough to sweep away the stored charges is required in the next line scan whether the array is saturated or not. Thirdly, as a result of the above, the normal data transmission is disabled. In the present embodiment, on the other hand, since the H-level period is set following to the period $t_3$, the charges generated by photo ionization are transferred almost freely to the shift register and swept away from the shift register and hence the above defects are completely eliminated and the normal data can be correctly transmitted.

While the two-phase clock CCD array has been shown in the illustrated embodiment, a single-phase clock or three-phase clock CCD array may be equally used. The control circuit 22 receives $T_S$, $T_{SCAN}$ and $t_3$, and it can readily produce the pulse $\phi_{TG}$ based on the three timings and the waveforms. The storage time period $t_1$ and read-out time period $t_3$ are set in the timing control circuit 8, which can readily produce the pulse $T_S$ and a pulse indicating the end of period $t_3$.

General operations have been explained thus far. In the present embodiment, the frequencies of the clocks $\phi_1$ and $\phi_2$ in the storage period $t_1$ are different from those in the periods $t_3$ (and $t_4$). The frequency $f_2$ in the period $t_1$ is set to be higher than the frequency $f_1$ in the periods $t_3$ (and $t_4$). For example, $f_1 = 500$ kHz and $f_2 = 2$ MHz. The frequencies $f_1$ and $f_2$ are generated by the control circuit 23. With this arrangement, the clearing of the unnecessary data which required the time $t_3$ in the prior art is reduced to the time $t_6$ which is shorter than the time $t_3$. Because the storage time is reduced, the light amount when the data is read can be increased and the reading speed can be increased.

While the two-phase clocking is used in the present embodiment, the present invention is not limited thereto. The control circuit 23 may include two frequency generators for $f_1$ and $f_2$ which are switched by $t_1$, $t_3$ and $t_4$. Alternatively, a frequency divider may be provided.

According to the present invention, the readout data which correctly reflects the data on the text can be produced with the reduced storage time.

What is claimed is:

1. A photoelectric converter apparatus comprising:
   a CCD photosensor having a CCD image sensor including a number of picture cells, a shift register for receiving image signals from said picture cells parallelly and producing a serial output and a transfer gate for parallelly connecting said picture cells to said shift register;
   a first control circuit for closing said transfer gate for a first period for storing said image signals, opening said transfer gate for a second period for transferring said image signals to said shift register, closing said transfer gate for a third period for shifting said shift register to produce an output signal therefrom and opening said transfer gate for a fourth period, said first, second, third and fourth periods repetitively occurring in this sequence; and a second control circuit for shifting said shift register at a first frequency during at least said third period and shifting said shift register at a second frequency higher than said first frequency during at least said first period.

2. A photosensing apparatus comprising:

a photosensor unit including a photodiode array, a transfer gate connected to said photodiode array for parallelly transferring signal charges stored in said photodiode array, and analog shift register connected to said transfer gate for parallelly receiving said signal charges and serially shifting the signal charges, and an output amplifier connected to said analog shift register for amplifying the signal;

a photosensor controlling circuit including a first control circuit for generating a gating signal and controlling said transfer gate and a second control circuit for generating a shift pulse signal and controlling said analog shift register, the first and second control circuits generating the gating and the shift pulse signals on the basis of a scan signal indicative of the start of each scanning and a storage time signal indicative of the time of storage in said photodiode array; and a photosensor driver unit connected to said photosensor unit and to said controlling circuit for driving said transfer gate and said analog shift register by said transfer gating signal and said shift pulse signal.

3. A photosensing apparatus according to claim 2, wherein said photodiode array includes CCD photodiodes and said sensor driver unit includes a series connection of a MOS driver and a damping resistor.

4. A photosensing apparatus according to claim 2, wherein the apparatus is cyclically operative for each scanning, the first control circuit closes the transfer gate during a storage period determined by said storage time signal for storing charges in said photodiode array, opens the transfer gate during a transfer period at the end of said storage period for transferring stored charges in the photodiode array to said analog shift register, closes the transfer gate during an output period for serially outputting said charges through the analog shift register to the output amplifier, and opens the transfer gate during the interval between said output period and said storage period, and said second control circuit shifts the analog shift register at least during the output period and said interval.

5. A photosensing apparatus according to claim 4, wherein said second control shifts the shift register at a first frequency during the output period and at a second frequency which is higher than said first frequency during said interval.

6. In photo-electrically reading a pattern by scan line by scanline by parallelly storing signal charges in a photodiode array, parallelly transferring the signal charges to an analog shift register through a parallel transfer gate and serially reading out the signal charges through the analog shift register by the use of a reading clock signal applied to the shift register, a method of driving the photosensing apparatus comprising the steps of:

storing signal charges in the photodiode array by closing the transfer gate for a storage period;

after the completion of the storage period, transferring the signal charges stored in the photodiode array to the analog shift register by opening the transfer gate;

after the transfer, shifting and outputting the signal charges successively by applying the clock signal to the analog shift register;

after the shifting and outputting, sweeping charges generated in the photodiode array to the outside thereof through said transfer gate and said analog shift register by opening the transfer gate and shifting the analog shift register, and wherein the step of sweeping charges includes applying the clock signal of a higher frequency to the analog shift register than the frequency of the clock signal in the shifting and outputting step.

7. A method of photoelectrically reading a pattern, comprising the steps of:

storing signal charges in a photosensor array including a multiplicity of picture elements;

transferring the signal charges stored in the photosensor array parallelly to a shift register including a multiplicity of shift stages;

shifting and outputting the signal charges through said shift register by applying a first clock signal to the shift register and closing the transfer gate;

sweeping any charges from the photosensor array parallelly through the transfer gate and serially through the shift register by applying a second clock signal to the shift register and opening the transfer gate;

repeating the above steps for each scan line, and wherein said second clock signal has a higher frequency than the first clock signal.

* * * * *